Figure 1:
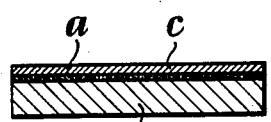

Oct. 18, 1938.　　　F. F. GORDON　　　2,133,292

COMPOUND METAL BODIES

Original Filed Aug. 16, 1934

Inventor
FREDERICK F. GORDON,
BY
Attorneys

Patented Oct. 18, 1938

2,133,292

UNITED STATES PATENT OFFICE 2,133,292

COMPOUND METAL BODIES

Frederick Felix Gordon, Sheffield, England

Original application August 16, 1934, Serial No. 740,184. Divided and this application April 19, 1937, Serial No. 137,781. In Great Britain April 12, 1934

8 Claims. (Cl. 29—181)

This application is a division of my co-pending application, Serial No. 740,184, filed August 16, 1934.

This invention relates to compound metal bodies, i. e. bodies consisting of layers of metals bonded (i. e. united) together by placing a bonding material between the surfaces to be united and effecting the union of said surfaces by means of heat or heat and pressure. The invention is applicable to the bonding one to another of ordinary irons and steels and alloyed irons and steels to form compound plates, sheets, slabs, billets, ingots, tubes or other products and is particularly useful for the bonding of such types of metals as low and high carbon steels, high speed steels and corrosion resisting (for example stainless and rustless) irons and steels, but its application is not limited thereto as it may be used for many other combinations of metals and alloys.

The object of the present invention is to provide an improved product involving the use of a bonding material which will possess such mechanical strength that the compound body will be "workable" as a whole, i. e. capable of being satisfactorily subjected to heat treatment, such as annealing, hardening or tempering and mechanical treatment such as rolling, forging, hammering or pressing or other similar operations to which metals and alloys may be subjected in the course of manufacture from blanks to semi-finished and finished products.

According to this invention the bonding material must be one which must melt or be brought to a condition suitable for forming a satisfactory bond at a temperature which does not exceed 1400° C. and is not so high as to destroy the advantageous characteristics of or otherwise injure, the metals of the bodies to be bonded but which will not melt at the temperature used for the subsequent hot working of the compound body, e. g. not below 1100° C.

As a result of my experiments I find that a bonding material consisting of the metal manganese or a metal alloy or mixture of metals containing manganese as its essential and controlling constituent possesses the foregoing characteristics.

According to the present invention a compound metal body adapted to be subsequently worked, comprises adjacent metal structures integrally united at their interfaces by a metallic bonding material consisting solely of manganese.

The invention also consists in a compound metal body adapted to be subsequently worked comprising adjacent metal structures integrally united at their interfaces by a metallic bonding material consisting of at least two constituents in which the metal manganese is always present and possesses the lowest melting point of the constituents.

The manganese may be used in combination with nickel, iron, cobalt, and chromium or any combination of these four latter metals. I have found that I get satisfactory results with a range of mixtures containing from about 98% manganese down to a mixture containing about 10% of manganese. This range of proportions is satisfactory for most working conditions. With a mixture having a somewhat lower percentage of manganese than 10% of the total it is still possible to obtain a bond which is sufficiently workable to satisfy certain of the practical requirements referred to although not capable of being worked to the same extent as a mixture containing higher percentages of manganese.

The most generally useful range, however, is that which has a manganese content of 90% down to 20%, the balance being one or more of the metals nickel, iron, cobalt or chromium or any combination thereof.

The substances usually occurring as impurities in the metal or metals of the bonding material may be present.

The bonding material is preferably in powdered form, but it may be in granular or other solid form, e. g. in sheet or strip form or a combination of powdered form and sheet or strip form.

It is to be understood, however, that the manganese being the controlling element, a definite amount of at least 15% of manganese must be used when the bonding material consists of manganese and one or more of the other metals mentioned and is used in solid form in which the metals have previously been melted together. Preferably, however, the manganese is employed either wholly or in part as free and uncombined (unalloyed) metal when used with one or more of the other metals.

With the bonding material a flux may be used such as borax, sodium or potassium fluoride or carbonate, resin, ammonium and zinc chlorides or any suitable mixture of these.

The bonding material previously referred to is, with the addition of about 8% of anhydrous borax or potassium fluoride and borax as a flux, found to be suitable for bonding corrosion resisting irons and steels and mild steels and irons, high carbon steels and corrosion resisting steels and irons; manganese steels and corrosion resisting irons and steels; and high speed steels and mild steels and irons.

The invention is applicable to the bonding of many types and compositions of irons and steels of which the following are typical examples:—

Corrosion resisting steels.
  Corrosion resisting irons.
  High chromium nickel steels.
  Manganese steels.
  Nickel steels.
  Ordinary alloy irons.
  Irons.
  Silico manganese steels.
  High speed steels.
  High chromium steels.
  Mild steels.
  Ordinary carbon steels.
  Chromium steels.
  Ordinary alloy steels.
  Nickel chromium steels.

Where the compound metal body is, after bonding to be worked as by rolling, forging, swaging, hammering, pressing or other mechanical operation, the said body should be pressed whilst hot to ensure that the compound metal body will possess such mechanical strength as to subsequently better withstand the stresses due to these aforesaid mechanical operations without risk of the bonded layers coming apart.

Where it is not convenient or desirable to apply the pressure whilst the compound body is still hot from the bonding operation, the pressure may be applied at any time afterwards by again reheating the compound body, provided the compound body is reheated to approximately the same temperature as was employed in the initial heating for bonding.

A sufficient quantity of the bonding material is used to provide a layer between the surfaces to be united and to substantially fill any spaces between the said surfaces.

If, for example, it is desired to bond a thin plate of corrosion resisting steel (high chromium or high chromium nickel steel) to a mild steel slab, the invention is carried out as follows:—If the surfaces to be united are not clean they are preferably cleaned by pickling, sandblasting or grinding, or otherwise. Between the said surfaces the selected bonding material, for example manganese, together with a flux, for example borax, is placed. The whole is then heated until it attains a temperature of about 1325° C., at which temperature the first stage of the bonding process is effected and the whole is then subjected to pressure which reduces the bonding material to film-like dimensions and completes the bonding. Whilst still sufficiently hot from the bonding process the composite slab may be reduced in cross sectional area or thickness by rolling or by some other known process or it may be allowed to cool and be subsequently re-heated to a suitable temperature for such reduction.

When bonding high carbon steels to low carbon steels a temperature of about 1260° C. is suitable, with a bonding material composed of 80% manganese and 20% of nickel. For bonding high speed steels to ordinary steels a temperature of about 1320° C. is suitable with a bonding material composed of 50% of manganese, 20% of iron and 30% of nickel. For bonding corrosion resisting (for example stainless and rustless) irons or steels to ordinary irons and steels a temperature of about 1350° C. is suitable with a bonding material composed of 50% manganese, 17% iron, 17% cobalt and 16% chromium. In each of these three examples a flux of anhydrous borax equal to about 8% of the total weight of the metallic bonding material is suitable.

I wish it to be understood that the three foregoing examples are given by way of illustration only and that the bonding materials referred to may in each case be varied over a wide range.

Compound metal sheets, plates, slabs or billets bonded according to my invention can be treated by subsequent processes substantially in the same manner as a single piece.

In the drawing accompanying this specification:

Figs. 1 to 5 illustrate the bonding of slabs and sheets.

Figure 2:
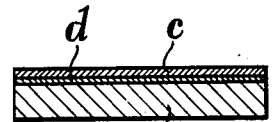
Figure 3:

In Fig. 1 a layer of powdered bonding material $a$ mixed with a flux is first placed over the surface of one side of a mild steel slab $b$ and then a sheet $c$ of corrosion resisting steel is applied; the composite body is then heated in a furnace and pressed as hereinbefore described resulting in the compound slab shown in Fig. 3 which can be rolled into thin sheets. Alternatively as shown in Fig. 2 a sheet $d$ of bonding material coated with a flux is used instead of a powdered bonding material between a mild steel slab $b$ and a sheet $c$ of corrosion resisting steel, the composite slab after heating and pressing resulting again in a compound slab as shown in Fig. 3.

Figure 4:
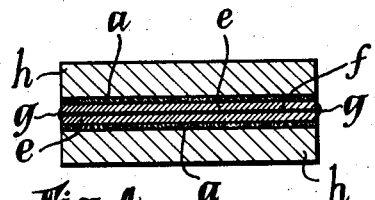

In a further embodiment of this invention as shown in Fig. 4, two slabs or sheets $e$ of metal having clean surfaces (which surfaces may be made clean by suitable treatment) are placed together with a separating or non-bonding material applied between their juxtaposed surfaces $f$. The edges of the slabs or sheets are then sealed at $g$, for example, by welding, and to each of the remote surfaces there is applied the bonding material $a$ and a metal sheet, slab or body $h$ whose contacting surface is preferably cleaned. The resultant compound body is then heated as before to bond the sheets $e$ to the adjacent slabs $h$ and pressure is preferably applied to the hot mass, which may then be rolled or forged immediately, or after cooling and reheating. Thereafter the mass is separated at the juxtaposed and non-bonded surfaces $f$ by removing the welded or sealed edges, for example by shearing, which results in two separate compound bodies.

Figure 5:
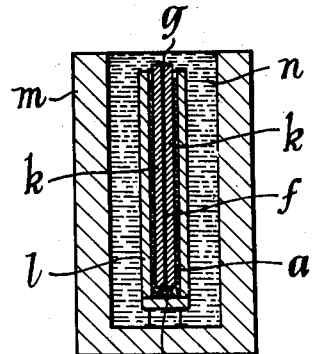

Fig. 5 shows another method of producing a compound body by first placing together two metal bodies $k$ with a separating material between their juxtaposed preferably cleaned surfaces $f$ and sealing the edges at $g$ as before described, then placing the assembly so defined in, but spaced apart from, a hollow body $l$ containing at least sufficient of the powdered bonding material to fill, when melted, the space between the bodies and then placing the whole in a mould $m$ and casting molten metal completely about the whole so as to heat and melt the bonding material, and whereby the cast metal $n$ becomes part of the resultant compound body, said body being adapted to be divided at the sealed edges $g$ of the nonbonded surfaces to form a plurality of compound bodies.

What I claim and desire to secure by Letters Patent is:—

1. A compound metal body consisting of metal structures integrally united substantially throughout their interfaces by a metallic bonding material comprising only manganese and an element selected from the group consisting of cobalt, nickel, chromium and iron, said compound metal body as a whole being capable of heat treatment and mechanical treatment.

2. A compound metal body consisting of metal structures integrally united substantially throughout their interfaces by a film of metallic bonding material comprising only manganese and an element selected from the group consisting of cobalt, nickel, chromium and iron, said compound metal body as a whole being capable of heat treatment and mechanical treatment.

3. A compound metal slab or sheet consisting of metal structures juxtapositioned at their interfaces which are of substantial area and united substantially throughout said interfaces by a metallic bonding material comprising only manganese and an element selected from the group consisting of cobalt, nickel, chromium and iron, said compound metal slab or sheet being capable of heat treatment and mechanical treatment.

4. A compound metal slab or sheet consisting of metal structures juxtapositioned at their interfaces which are of substantial area and united substantially throughout said interfaces by a metallic bonding material comprising only manganese and an element selected from the group consisting of cobalt, nickel, chromium and iron, the interfaces of the metal structures of the compound slab or sheet having the same relative relationship which they had prior to being bonded.

5. A compound metal body consisting of two preformed metal structures united substantially throughout their interfaces by an intermediate metallic bonding material comprising only manganese and an element selected from the group consisting of cobalt, nickel, chromium and iron, the bonding of the preformed structures having been effected by the fusion only of said bonding material in situ.

6. A compound metal body consisting of an intermediate and outer metal structures, the outer structures being integrally united to the intermediate structure at their interfaces by a metallic bonding material comprising only manganese and an element selected from the group consisting of cobalt, nickel, chromium and iron, said compound metal body as a whole being capable of heat treatment and mechanical treatment.

7. A compound metal body consisting of intermediate and outer metal structures, the juxtapositioned interfaces of the intermediate structures being non-bonded and the intermediate structures being bonded to the outer structures throughout their interfaces by a bonding material comprising only manganese and an element selected from the group consisting of cobalt, nickel, chromium and iron, said compound metal body as a whole being capable of heat treatment and mechanical treatment.

8. A compound metal body consisting of inner, intermediate, and outer metal structures, the inner structures having juxtapositioned interfaces which are non-bonded and outer faces which are bonded to the inner faces of the intermediate structures by a bonding material comprising manganese, and the outer structures being autogenously welded one to each of the outer faces of the intermediate structures, said compound metal body as a whole being capable of heat treatment and mechanical treatment.

FREDERICK FELIX GORDON.